(12) United States Patent
Onozawa et al.

(10) Patent No.: US 7,038,413 B2
(45) Date of Patent: May 2, 2006

(54) TRAPPING DETECTION DEVICE OF OPENING/CLOSING MEMBER

(75) Inventors: Satoru Onozawa, Anjo (JP); Takashi Kikuta, Kariya (JP); Tsutomu Tanoi, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 475 days.

(21) Appl. No.: 10/607,210

(22) Filed: Jun. 27, 2003

(65) Prior Publication Data

US 2004/0065498 A1 Apr. 8, 2004

(30) Foreign Application Priority Data

Jun. 28, 2002 (JP) ............................. 2002-189069

(51) Int. Cl.
*H02P 1/04* (2006.01)

(52) U.S. Cl. .................. 318/443; 318/266; 318/282; 318/471; 49/26; 49/28

(58) Field of Classification Search ................ 318/280, 318/282, 286, 466, 468, 443, 445, 471; 49/26, 49/28
See application file for complete search history.

(56) References Cited

U.S. PATENT DOCUMENTS

| | | | |
|---|---|---|---|
| 4,585,981 A * | 4/1986 | Zintler | 318/615 |
| 4,870,333 A * | 9/1989 | Itoh et al. | 318/286 |
| 5,530,329 A | 6/1996 | Shigematsu et al. | |
| 5,734,245 A * | 3/1998 | Terashima et al. | 318/453 |
| 5,932,931 A * | 8/1999 | Tanaka et al. | 307/10.1 |
| 6,580,243 B1 * | 6/2003 | Itami et al. | 318/452 |
| 6,806,664 B1 * | 10/2004 | Beishline | 318/280 |

FOREIGN PATENT DOCUMENTS

| | | |
|---|---|---|
| DE | 195 11 581 A1 | 10/1995 |
| JP | 6-280446 A | 10/1994 |

* cited by examiner

*Primary Examiner*—Rina Duda
(74) *Attorney, Agent, or Firm*—Buchanan Ingersoll PC

(57) ABSTRACT

A trapping detection device of an opening/closing member includes a motor, a motor speed detection device, a control device, a voltage detection device for detecting a drive voltage applied to the motor, an actual speed decision device for deciding the actual speed of a rotation of the motor, an estimated speed calculation device for calculating the estimated speed of the rotation of the motor based on the drive voltage, an estimated speed storage device for storing the estimated speed for a predetermined time, an estimated speed correction device for correcting the estimated speed based on a difference between the actual speed and the estimated speed obtained before the predetermined time, a trapping determination device for determining the trapping based on a change state of a difference between the estimated speed being corrected and the actual speed.

6 Claims, 6 Drawing Sheets

US 7,038,413 B2

TRAPPING DETECTION DEVICE OF OPENING/CLOSING MEMBER

This application is based on and claims priority under 35 U.S.C. § 119 with respect to Japanese Application No. 2002-189069 filed on Jun. 28, 2002, the entire content of which is incorporated herein by reference.

FIELD OF THE INVENTION

This invention generally relates to a trapping detection device of an opening/closing member for performing an opening/closing operation relative to a fixed member. More particularly, the present Invention pertains to a control of the trapping detection device.

BACKGROUND OF THE INVENTION

Recent vehicles including an opening/closing member such as a sunroof or a window regulator are generally provided with a safety mechanism. When the opening/closing member is operated by a motor, a safety mechanism detects trapping of an obstacle, and then stops a closing operation of the opening/closing member or moves the opening/closing member in a reverse direction, i.e. an opening direction, by driving the motor.

In known methods, the trapping of the obstacle is detected based on a rotational state of the motor. A rotation detecting sensor including a hall element and the like detects a change of the rotational state of the motor for driving the opening/closing member. The trapping is then detected based on a pulse signal from the rotation detecting sensor.

Japanese Patent Laid-Open Publication No. 6-280446 discloses a opening/closing control device that determines the occurrence of trapping when a drive speed and a drive acceleration of the motor is less than a predetermined value, which is determined based on a drive speed and a drive acceleration of the opening/closing member. The opening/closing control device detects the rotation of the motor by a motor position detecting sensor and calculates a motor rotation speed and a motor rotation acceleration. The opening/closing control device performs feedback/reverse control by comparing the motor rotation speed with a speed threshold value when a motor rotation speed change is regular. Alternatively, the opening/closing control device performs reverse control by comparing the motor rotation acceleration with an acceleration threshold value when the motor rotation speed change is not regular. At this time, the speed threshold value and the acceleration threshold value are corrected according to the drive voltage, the sliding resistance of the opening/closing member, and the like.

However, the following problem arises when the disclosed device is employed in a vehicle. Power is generally supplied to the opening/closing control device (for example, DC: 12V) from a battery in the vehicle. The voltage is thus fluctuated in response to a state of the load connected to the battery. If the motor for actuating the opening/closing member is driven by the battery which voltage is fluctuated, the motor speed is also fluctuated. In the method in which the speed of the motor having the fluctuated battery voltage is compared with a predetermined speed for the trapping detection, the wrong trapping detection may be caused by the fluctuation of the motor speed.

In order to prevent the wrong trapping detection due to the fluctuation of the motor speed, it is considered to lower a threshold value for determination (therefore the trapping is less determined). However, if the threshold value for determination is simply lowered, a longer time is required for actually detecting the trapping after the trapping occurrence. As a result, the, trapping detection is delayed and thus the load, which the trapped obstacle receives (trapping force), is increased. The reliability of the opening/closing control device may be lowered accordingly.

Thus, a need exists for a trapping detection device which detects the trapping accurately and improves the reliability thereof.

SUMMARY OF THE INVENTION

According to an aspect of the present invention, a trapping detection device of an opening/closing member includes a motor for actuating the opening/closing member in an opening/closing direction, a speed detection means for detecting a rotation state of the motor, and a control means for detecting the trapping during an operation of the opening/closing member based on an information sent from the speed detection means and for actuating the motor in a reverse direction when the trapping is detected. The trapping detection device also includes a voltage detection means for detecting a drive voltage applied to the motor for actuating the motor, an actual speed decision means for deciding the actual speed of a rotation of the motor by the speed detection means, an estimated speed calculation means for calculating the estimated speed of the rotation of the motor based on the drive voltage, an estimated speed storage means for storing the estimated speed for a first predetermined time, an estimated speed correction means for correcting the estimated speed based on a difference between the actual speed and the estimated speed obtained before the first predetermined time, and a trapping determination means for determining the trapping in the opening/closing member based on a change state of a difference between the estimated speed being corrected and the actual speed.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

An embodiment of the present invention is explained referring to attached drawings. Although the embodiment is employed in a vehicle sunroof device in the following explanation, a usage of the trapping detection device is not limited. The trapping detection device of an opening/closing member is applicable, for example, to a power window regulator device for lifting or lowering a window of the vehicle, a slide door device for sliding a side door in a longitudinal direction of the vehicle, and an automatically operated door device for buildings.

Figure 1:
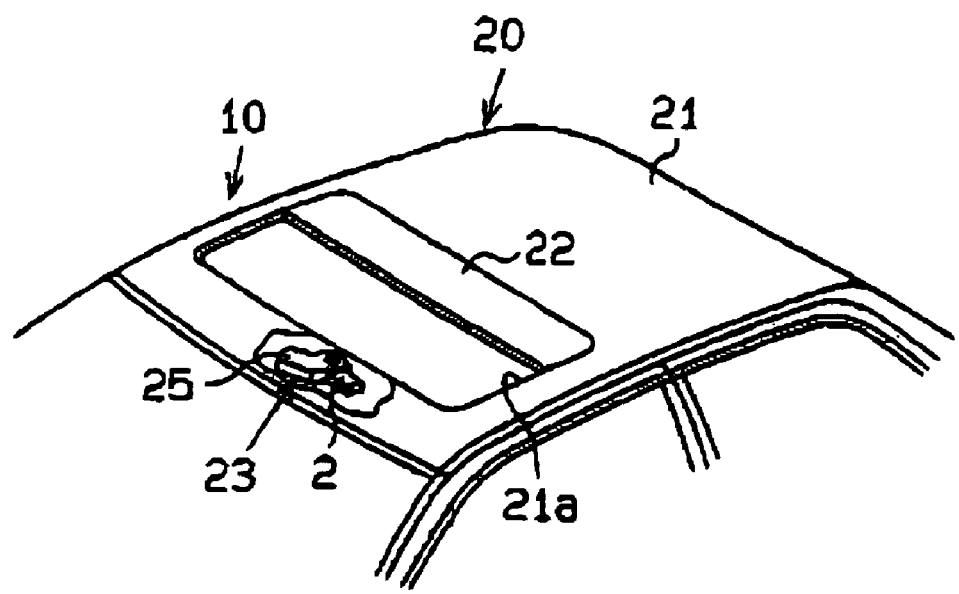
FIG. 1 is a perspective view of a trapping detection device of an opening/closing member according to an embodiment of the present invention employed in a vehicle sunroof device.

FIG. 1 shows a sunroof device 10 (trapping detection device) having a trapping detection function installed in a vehicle 20. In FIG. 1, a roof 21 of the vehicle 20 includes a rectangular opening 21a and a roof pane 22 (opening/closing member) for covering the opening 21a. The roof pane 22 is slidable in a longitudinal direction of the vehicle by a known slide mechanism and is tilted in an upward-downward direction by a known tilt mechanism.

A drive unit 23 for actuating the roof pane 22 is housed in a front portion of the roof 21, near the opening 21a. The drive unit 23 includes a motor 2 and a gear unit 25 connected to each other. An output shaft of the gear unit 25 is operatively connected to the slide mechanism and the tilt mechanism. When the motor 2 is driven by a controller 1 shown in FIG. 2, the slide operation and the tilt operation of the roof pane 22 are activated.

Figure 2:
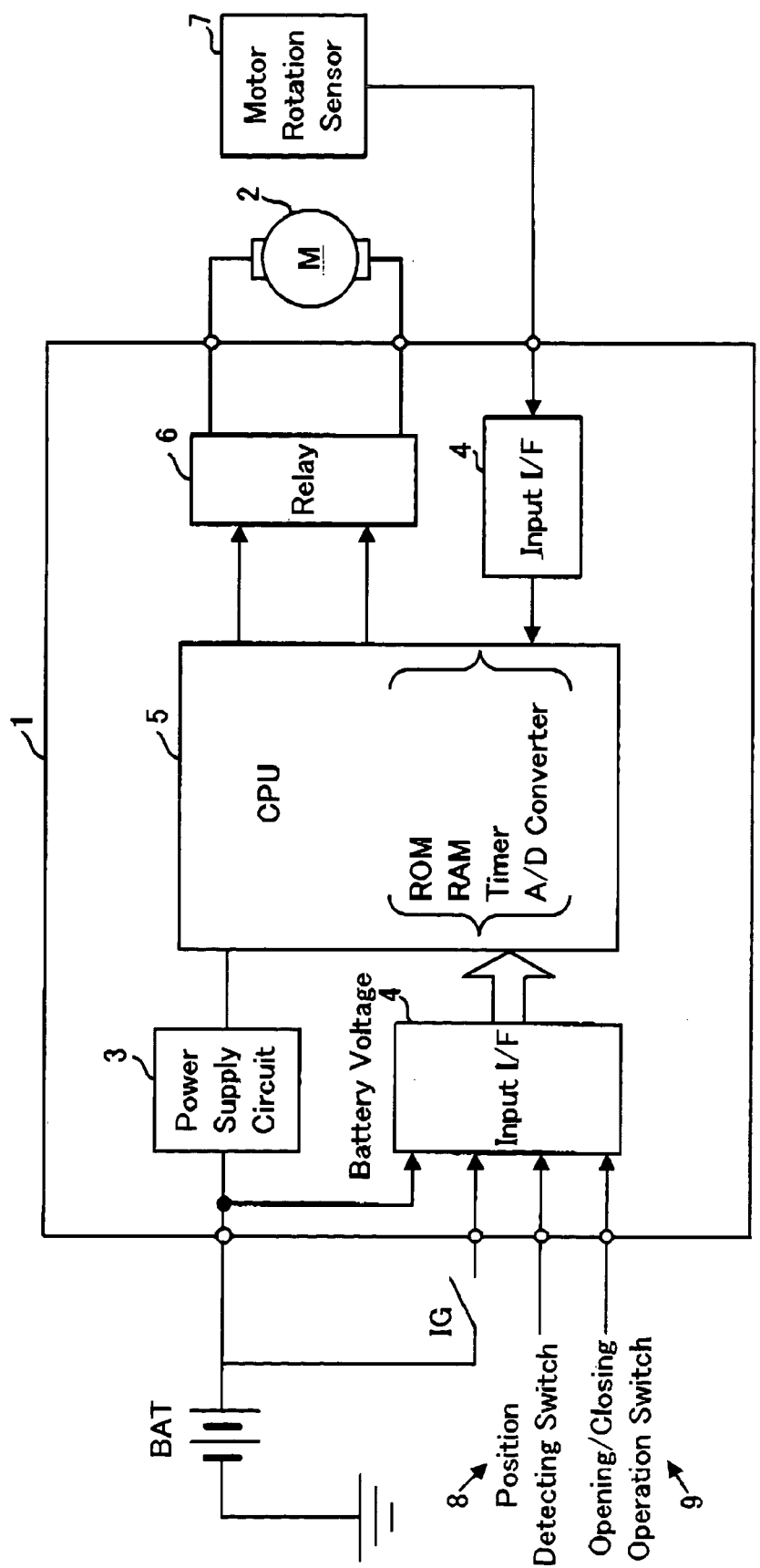
FIG. 2 is a system diagram of the trapping detection device shown in FIG. 1.

FIG. 2 is a system diagram of the controller 1 of the sunroof device 10. The controller 1 actuates the roof pane 22 to control the opening/closing operation thereof, The controller 1 receives a signal from a position detecting switch 9 for detecting the position of the roof pane 22 and an opening/closing operation switch 8 for actuating the roof pane 22. In response to the drive signal output from the controller 1 to the motor 2 based on the signal from the position detecting switch 9 and the opening/closing operation switch 8, the roof pane 22 is operated.

Further, when an obstacle such as an arm or another object is trapped between the roof pane 22 and the opening 21a of the vehicle 20, the rotation of the motor 2 is inhibited, thereby reducing the rotation speed of the motor 2. The detection of the trapping is performed using this characteristic that the rotation speed of the motor is reduced. The closing operation of the roof pane 22 is immediately stopped at the detection of the trapping and the reverse operation for opening the roof pane 22 is performed by the trap detection mechanism so as to ensure the safety of the vehicle occupants.

The controller 1 includes CPU 5 including a ROM for storing a program therein, a RAM for storing numerical values necessary for program operation, a timer measuring a pulse cycle, and an A/D converter for converting an analogue value of input battery voltage and the like into a digital value. The CPU 5 also includes an input interface (Input I/F) 4 for achieving compatibility between the input signal and the CPU 5, and a relay 6 for regulating the rotation direction of the motor 2, which has a function to actuate the roof pane 22 in opening/closing direction during the sliding operation, in opening or closing direction. The CPU further includes a power supply circuit 3 supplied with a power (normally 12V) from a battery of the vehicle for generating a stable constant voltage (for example, 5V). The constant voltage generated in the power supply circuit 3 is supplied to the CPU 5. The input I/F 4 of the controller 1 is supplied with the battery voltage and also the motor 2 is supplied with the battery voltage. The sunroof device 10 also includes a motor rotation sensor 7 for outputting a pulse synchronized to the rotation of the motor 2 to the controller 1.

The controller 1 receives a signal from the motor rotation sensor 7, the position detecting switch 9, and the manually-operated opening/closing operation switch 8. The motor rotation sensor 7 detects a cycle signal of one pulse by means of a hall element when a magnet (not shown)(for example, a magnet having a N pole and a S pole is provided) provided on the output shaft of the motor 2 rotates one time. The signal input to the controller 1 is sent to the CPU 5 through the input I/F 4, and the battery voltage is also input to the CPU 5 through the input I/F 4 in the controller 1. The signal from the motor rotation sensor 7 cycles between ON and OFF by synchronized with the motor rotation and the alternating pulse output is input to the CPU 5. The CPU 5 compares the level of the input pulse signal from the motor rotation sensor 7 and detects the edge of the pulse signal accordingly.

The CPU 5 outputs a signal to the relay 6 so as to actuate the motor 2 based on the input signal from the motor rotation sensor 7, the opening/closing operation switch 8 and the position detecting switch 9. The CPU 5 controls to stop or rotate the motor 2 in opening/closing direction by switching the condition and the direction of energizing the relay 6.

Figure 3:
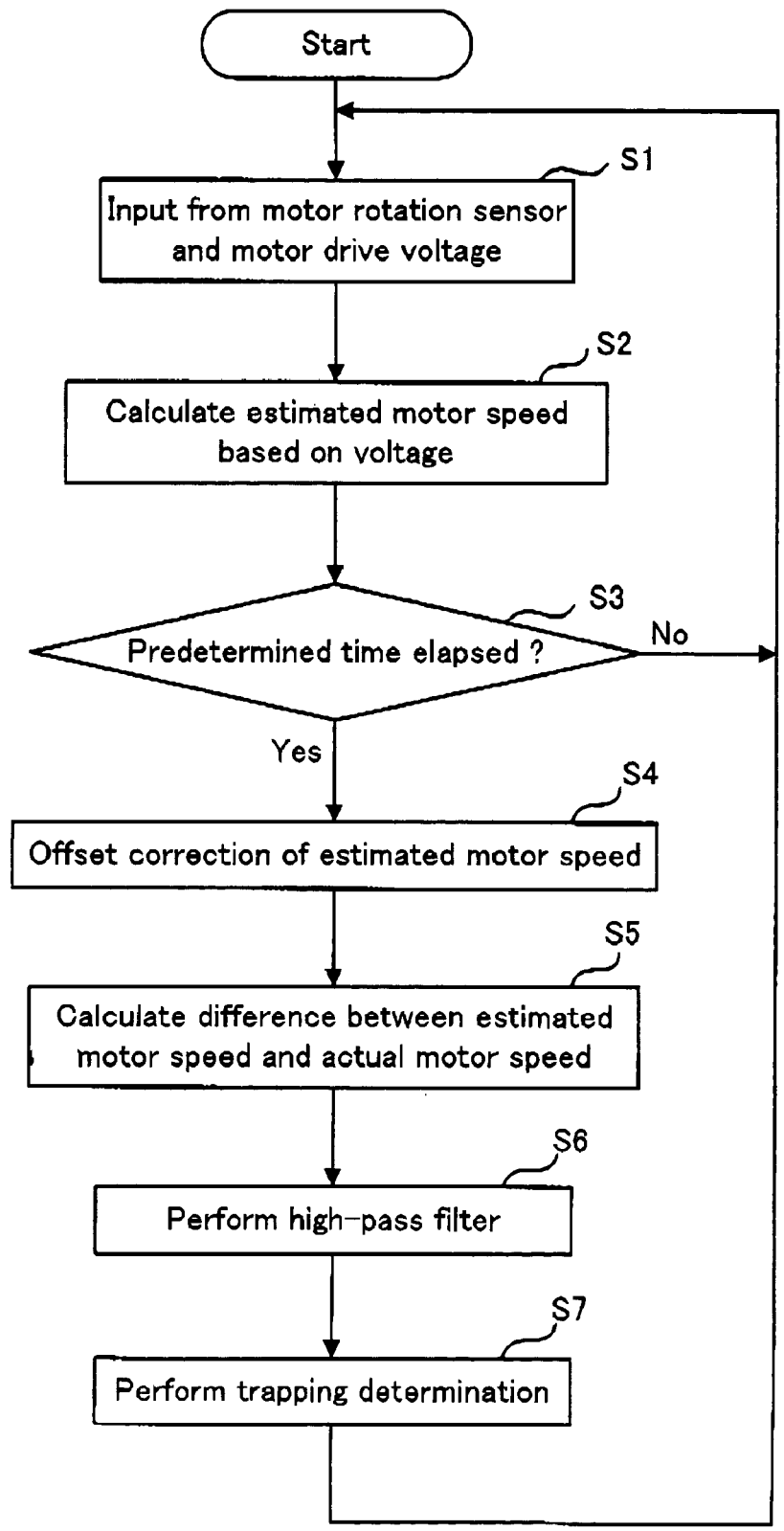
FIG. 3 is a flowchart showing a trapping determination procedure performed by CPU shown in FIG. 2.

The trapping determination procedure by the controller 1 is explained referring to a flowchart FIG. 3. Each step performed in a program is only shown with "S" in the following explanation. Further, a known method that the motor is driven in response to the switch status is employed for the opening/closing control of the roof pane 22 by an operation of the opening/closing operation switch 8, which explanation is omitted.

The trapping determination procedure is carried out repeatedly at predetermined time intervals (for example, several ms). At S1, the input operation to the CPU 5 from the motor rotation sensor 7 and the motor drive voltage is performed. In the input operation from the motor drive voltage, the battery voltage at the time is monitored by the CPU 5 through the input I/F 4 since the motor 2 is driven by the battery voltage. The CPU 5 calculates the rotation speed of the motor 2 based on a pulse output such as a sine wave and a rectangular wave from the motor rotation sensor 7. In this case, the rotation speed of the motor 2 is obtained, for example, by a map shown in FIG. 4 indicating the static characteristic that the motor rotation speed is in proportion to the motor drive voltage. In addition, the actual speed of the motor 2 is obtained, for example, by a number of the rising edge and the falling edge of the pulse detected within a predetermined time period. According to the present embodiment, the motor rotation speed is detected by the motor rotation sensor 7. Alternatively, the motor rotation speed may be detected by an optical means using the optical reflection, or an acoustic means using the acoustic reflection. Further, a speed sensor may be employed for directly detecting the rotation status such as the motor rotation number and the motor speed of the motor 2.

When the motor rotation speed is obtained at S1, then an estimated speed of the motor 2 is calculated at S2. In the calculation of the estimated motor speed, the motor speed is estimated from the motor rotation speed, which is regarded as the estimated motor speed. When the motor rotation speed is predetermined as mv, a terminal voltage on one side is predetermined as Vb, a proportional gain is predetermined as a, and an offset is predetermined as b0, the following formula is obtained.

$$mv = a \times V_b + b_0 \qquad \text{(Formula 1)}$$

Figure 5A:
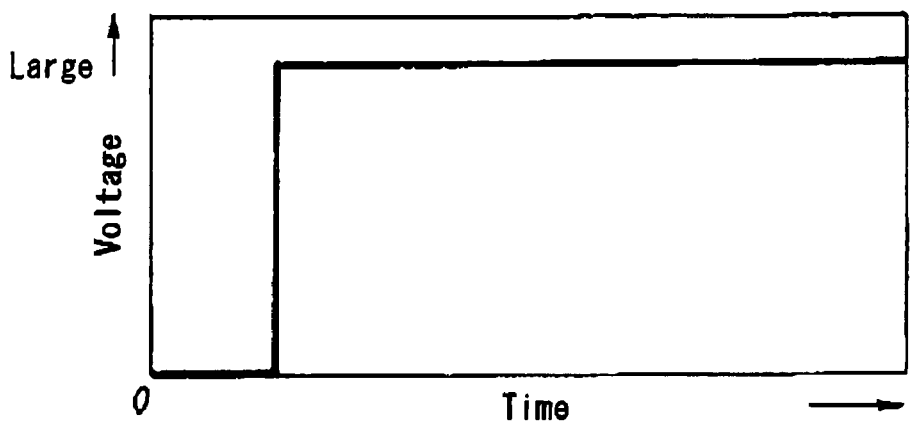
FIGS. 5A and 5B are graphs explaining an idle time and an offset correction when the motor is driven.
Figure 5B:
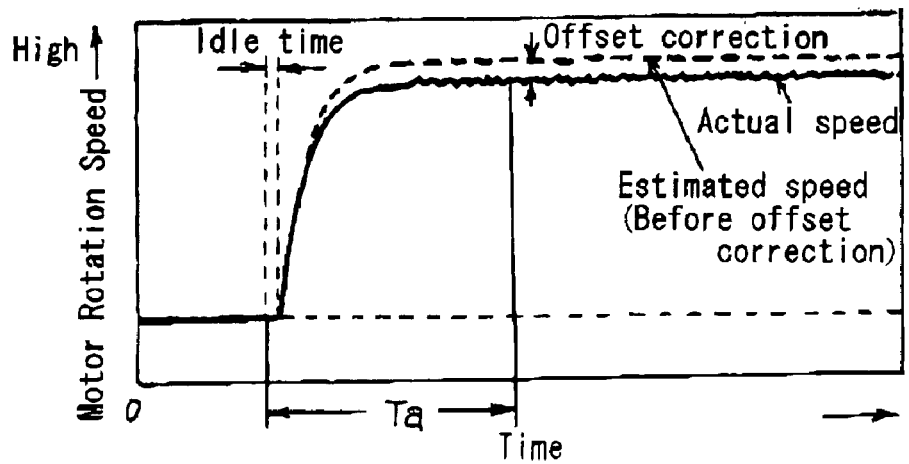
Figure 6:
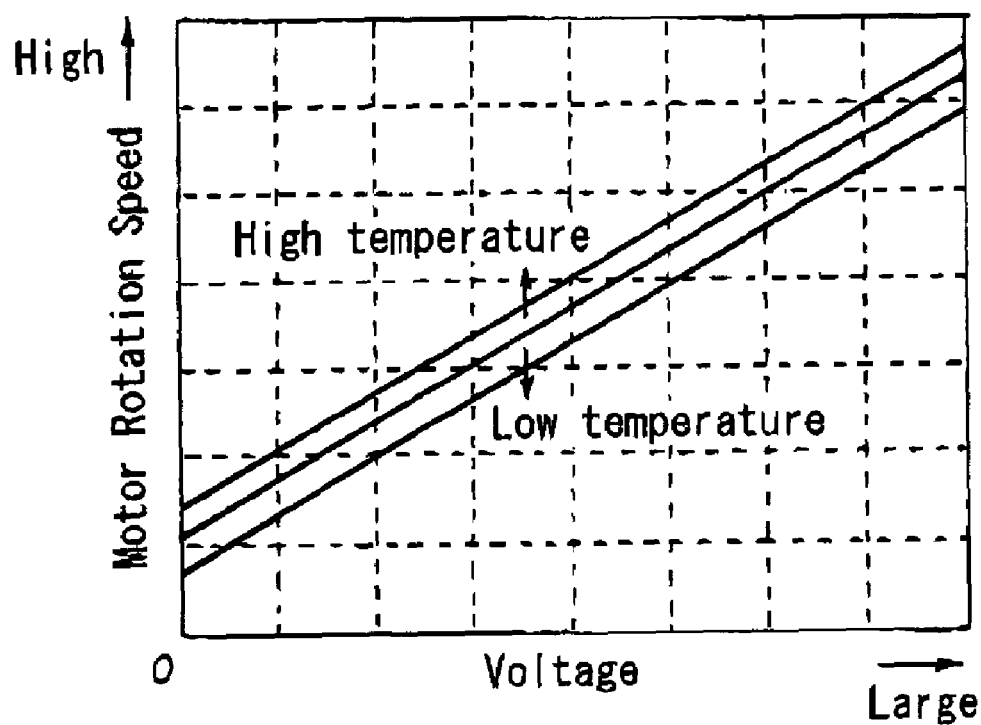
FIG. 6 is a graph showing a relationship between the motor drive voltage and the motor rotation speed when a temperature change of the motor is considered.

Generally, the motor speed starts rising after a delay time as shown in FIG. 5B when a step input is applied to the motor 2 as shown in FIG. 5A. Then, the motor speed gradually rises along with a first delay. In this case, the accuracy is more improved if the secondary or further higher modeling is employed. However, according to the present embodiment, the primary modeling only is employed as an example.

The dynamic characteristic of the motor rotation speed relative to the voltage variation is shown in the following formula when the time constant predetermined as is and the idle time predetermined as dly are taken into consideration.

$$mv = \frac{a}{T_s \cdot s + 1} \cdot e^{-dly \cdot s} \cdot V_b + b_0 \qquad \text{(Formula 2)}$$

Figure 4:
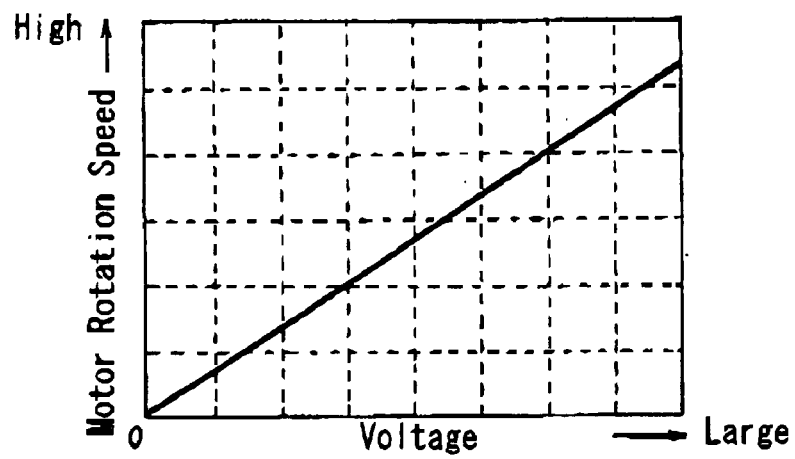
FIG. 4 is a graph showing a relationship between a motor drive voltage and a motor rotation speed.

The line of the map in FIG. 4 is shifted upward and downward depending on the temperature of the motor 2 due to the characteristic thereof. The proportional gain a is not changed even if the temperature of the motor 2 is varied. However, the suitability of the roof pane 22 is improved when the roof pane 22 slides within the opening 21a of the roof 21 since a seal member (not shown) for sealing the roof pane 22 and the roof 21 provided therebetween at the opening 21a becomes soften in case that the temperature of the motor 2 is high. The rotation speed of the motor 2 becomes higher accordingly. On the contrary, when the temperature of the motor 2 is low, the slidability of the roof pane 22 is deteriorated since the seal member becomes stiff, thereby causing the motor rotation speed slow. Accordingly, the offset b0 for adjusting the deviation of the rotation speed of the motor 2 is varied in response to the temperature change of the motor 2.

In the case of rewriting the formula 2 by considering the deviation of the offset b0, the following formula is obtained. Δb shows the deviation of the offset b0.

$$mv = \frac{a}{T_s \cdot s + 1} \cdot e^{-dly \cdot s} \cdot V_b + (b_0 + \Delta b) \qquad \text{(Formula 3)}$$

According to the present embodiment, Δb is corrected based on a difference between the estimated motor speed and the actual motor speed at S4 in order to reduce the deviation caused by the calculation of the formula 2. The correction of Δb is conducted one time after a predetermined time is elapsed so that the rotation of the motor 2 is stable when the drive voltage is applied to the motor 2. The rotation speed of the motor 2 starts rising after the delay time as shown, in FIG. 5B and then gradually rises along with the first delay. The predetermined time in S3 desirably corresponds to Ta required for the motor rotation speed to be stabilized after the motor 2 starts being driven. When Ta (for example, several msec) is not elapsed, the motor rotation is not stable and thus the offset correction is not performed.

When the actual speed of the motor 2 detected by the pulse output from the motor rotation sensor 7 is stabilized after the predetermined time from the motor start, a difference err (speed difference) between the actual rotation speed (actual speed) of the motor 2 rmv and the estimated rotation speed (estimated speed) of the motor 2 emv is calculated for being used as the offset correction value Δb (=rmv−emv) (refer to FIG. 5B).

The offset correction value Δb can be obtained at a predetermined time (i.e., one point) at which the speed difference err between the actual speed rmv and the estimated speed emv of the motor 2 is calculated. In addition, if the offset correction value Δb is required with more accuracy, the average value of the speed difference err is obtained during a predetermined time period or a known low-pass filter is applied to the speed difference err obtained in a predetermined time period for eliminating a higher frequency range than a predetermined value.

At S6, a high-pass filter is applied to the estimated speed being corrected for eliminating a lower frequency range than a predetermined value. Then, at S7, the trapping determination is conducted. The trapping is determined based on a difference between the estimated speed being corrected by calculation and the actual speed of the motor 2. In this case, the estimated speed of the motor 2 is evaluated based on the motor drive voltage and therefore varies depending on the fluctuation of the motor drive voltage. If the movement of the roof pane 22 is restricted during the closing operation, the actual speed of the motor 2 is decreased. That is, the actual speed of the motor 2 is slower than the estimated speed. Then, if the speed difference err between the actual speed and the estimated speed of the motor 2 exceeds a predetermined threshold value being preset, the CPU 5 determines that the trapping is caused during the operation of the roof pane 22 and thus the rotation of the motor 2 is restricted. In this case, the CPU 5 determines the occurrence of the trapping based on the change state of the value of the speed difference err after passing through the filter. The change state of the value can be a change amount or a change rate instead. In addition, the CPU 5 may determine the trapping by detecting the change state of the speed difference err by differentiation thereof.

Figure 7A:
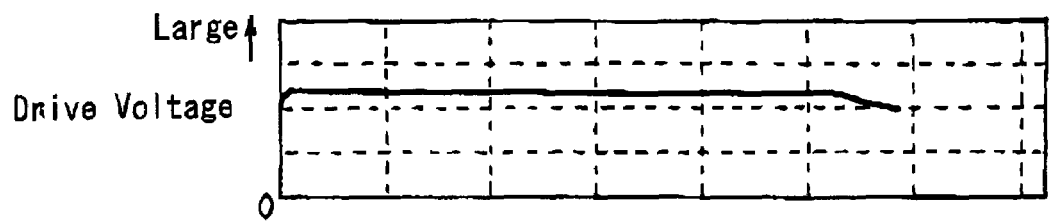
FIGS. 7A, 7B, 7C and 7D are graphs explaining the trapping determination.
Figure 7B:
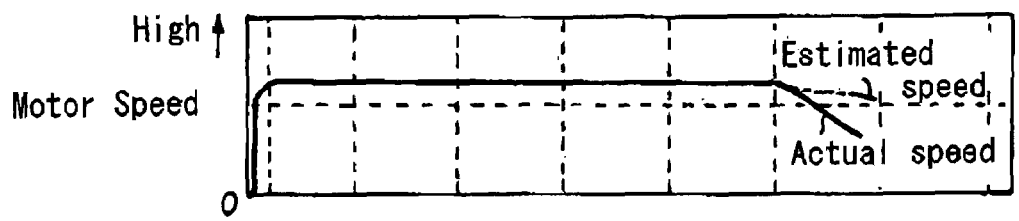
Figure 7C:
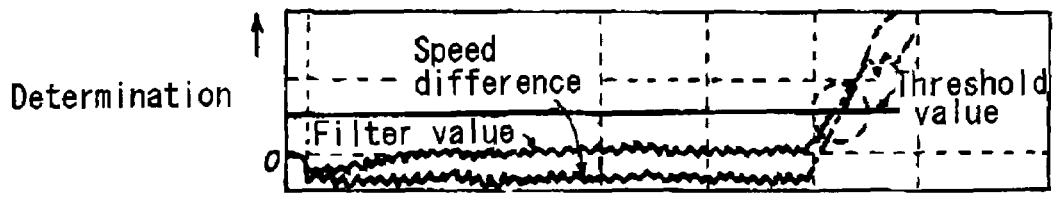

FIGS. 7A, 7B, 7C and 7D are graphs each showing a state when the trapping occurs. FIG. 7A shows the drive voltage of the motor 2. FIG. 7B shows the estimated speed of the motor 2 obtained by calculation and the actual speed of the motor 2. According to FIGS. 7A and 7B, the estimated motor speed is varied corresponding to the change of the motor drive voltage. FIG. 7C shows the speed difference err before and after passing through the high-pass filter. When the known high-pass filter is conducted, the stationary offset is eliminated and the value of the speed difference err after passing through the filter approaches to 0 point. Further, when the value after passing through the filter exceeds the predetermined value for determining the trapping, it is determined that the trapping is caused during the closing operation of the roof pane 22.

Figure 7D:
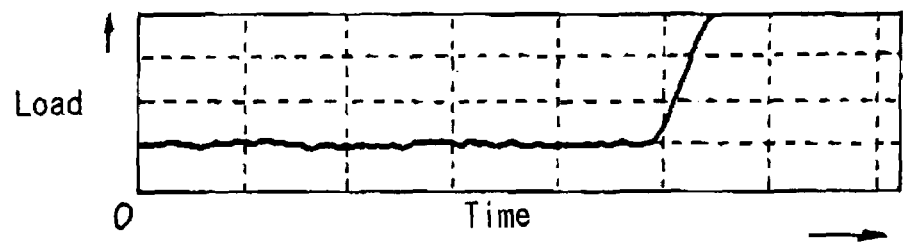

According to the aforementioned trapping detection device, the threshold value for the trapping determination is preset and no change is required in response to the motor drive voltage and the like. The timing for determining the trapping is thus not delayed. Although the trapping force that the trapped obstacle receives is increased as shown in FIG. 7D when the trapping occurs, the determination is not delayed and thus the increase of the trapping force can be prevented. As is understood from the afore-mentioned explanation, according to the present embodiment, the CPU 5 includes not only the control means for controlling the trapping but also a voltage detection means for detecting the voltage applied to the motor 2, an actual speed decision means for determining the actual speed of the motor 2, an estimated speed calculation means for calculating the estimated speed of the motor 2, an estimated speed storage means for storing the estimated speed of the motor 2, an estimated speed correction means for correcting the estimated speed of the motor 2, and a trapping determination means for determining the incident of the trapping.

According to the present embodiment, the rotation state of the motor (for example, motor rotation number, motor speed) is detected by the speed detection means. Then, the motor rotation speed is calculated based on the drive voltage applied to the motor. When the motor rotation speed is determined, the estimated motor speed is calculated, which is stored for a predetermined time. The difference between the actual motor speed obtained by the speed detection means and the estimated motor speed stored before the predetermined time is calculated, which is used for the correction of the estimated motor speed. The trapping is determined based on the change state (for example, change amount or change rate) of the difference between the estimated motor speed being corrected and the actual motor speed by considering the change of the drive voltage applied to the motor.

The motor rotation speed is estimated based on the motor drive voltage. The estimated speed of the motor is calculated and then corrected based on the difference between the actual speed of the motor and the estimated speed obtained before the predetermined time. Thus, the motor rotation speed can be estimated by considering the change of the motor drive voltage in the case that the motor drive voltage is changed. In addition, the estimated speed obtained by calculation can be corrected based on the difference between the actual motor speed and the estimated motor speed obtained before the predetermined time. Therefore, the correction is performed on the estimated speed obtained in a state in which the motor rotation is stabilized. The accuracy of the estimated motor speed obtained in this way is improved. Accordingly, the accurate trapping determination is possible when the estimated speed is employed in the trapping determination.

According to the trapping determination means of the CPU 5, the incident of the trapping can be detected by simply comparing the difference between the estimated speed being corrected and the actual speed and the predetermined threshold value. The threshold value for detecting the trapping does not required to be changed and thus the determination timing of the trapping is not delayed when compared to the conventional device. The trapping force can be prevented from increasing due to the delay of the trapping determination.

Further, according to the control means of the. CPU 5, the high-pass filter is applied to the difference between the estimated speed being corrected and the actual speed of the motor. When the value after passing through the filter exceeds the predetermined threshold value, the trapping is determined. By performing the high-pass filter on the difference between the estimated speed being corrected and the actual speed of the motor, the offset from 0 point is eliminated, thereby performing the trapping determination with high accuracy and improving the reliability of the trapping detection device.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

What is claimed is:

1. A trapping detection device of an opening/closing member, comprising:
   a motor for actuating the opening/closing member in an opening/closing direction;
   a speed detection means for detecting a rotation state of the motor;
   a control means for detecting the trapping during an operation of the opening/closing member based on an information sent from the speed detection means and for driving the motor in a reverse direction when the trapping is detected;
   a voltage detection means for detecting a drive voltage applied to the motor for driving the motor;
   an actual speed decision means for deciding the actual speed of a rotation of the motor by the speed detection means;
   an estimated speed calculation means for calculating the estimated speed of the rotation of the motor based on the drive voltage;
   an estimated speed storage means for storing the estimated speed for a first predetermined time;
   an estimated speed correction means for correcting the estimated speed based on a difference between the actual speed and the estimated speed obtained before the first predetermined time;
   a trapping determination means for determining the trapping in the opening/closing member based on a change state of a difference between the estimated speed being corrected and the actual speed.

2. A trapping detection device of an opening/closing member according to claim 1, wherein the trapping determination means determines the trapping state when the difference between the estimated speed being corrected and the actual speed exceeds a first predetermined threshold value.

3. A trapping detection device of an opening/closing member according to claim 2, wherein the trapping determination means includes a high-pass filter for filtering based on the difference between the estimated speed being corrected and the actual speed and determines the trapping state when a filtered value after passing through the high-pass filter exceeds a second predetermined threshold value.

4. A trapping detection device of an opening/closing member according to claim 3, wherein the speed detection means includes a motor rotation sensor for outputting a pulse signal synchronized to the rotation of the motor to the control means.

5. A trapping detection device of an opening/closing member according to claim 4, wherein the actual speed decision means detects the actual speed of the rotation of the motor based on a number of a rising edge or a falling edge of the pulse output from the motor rotation sensor detected within a predetermined time period.

6. A trapping detection device of an opening/closing member according to claim 5, wherein the difference between the actual speed and the estimated speed obtained before the first predetermined time is applied to correct the estimated speed when a second predetermined time is elapsed after the drive voltage is applied to the motor.

* * * * *